US012682085B1

(12) United States Patent

Schneider

(10) Patent No.: US 12,682,085 B1

(45) Date of Patent: Jul. 14, 2026

(54) AUTONOMOUS STATE SYNTHESIS VIA SEQUESTERED ENTROPY METHOD, SYSTEM, PRODUCT, AND APPARATUS

(71) Applicant: Eric Schneider, Hallandale Beach, FL (US)

(72) Inventor: Eric Schneider, Hallandale Beach, FL (US)

( * ) Notice: Subject to any disclaimer, the term of this patent is extended or adjusted under 35 U.S.C. 154(b) by 0 days.

(21) Appl. No.: 19/533,117

(22) Filed: Feb. 7, 2026

(51) Int. Cl.
G06F 21/60 (2013.01)

(52) U.S. Cl.
CPC ................................. G06F 21/602 (2013.01)

(58) Field of Classification Search
None
See application file for complete search history.

(56) References Cited

U.S. PATENT DOCUMENTS

| | | | |
|---|---|---|---|
| 10,079,673 B2 | 9/2018 | Brown | |
| 10,373,426 B2 | 8/2019 | Robinson et al. | |
| 10,748,377 B1 | 8/2020 | Showers et al. | |
| 10,938,557 B2 | 3/2021 | Fan et al. | |
| 11,083,960 B2 | 8/2021 | Kumar | |
| 2021/0182423 A1* | 6/2021 | Padmanabhan | H04L 9/3271 |
| 2024/0329937 A1 | 10/2024 | Mandich et al. | |
| 2024/0388457 A1* | 11/2024 | Gordon | G06F 21/602 |
| 2025/0160668 A1* | 5/2025 | Frank | A61B 5/0075 |

* cited by examiner

*Primary Examiner* — Bassam A Noaman

(57) ABSTRACT

A distributed computing system and method for autonomous, deterministic state synthesis are disclosed. The system comprises a persistent data ledger storing cryptographic commitments for non-disclosed entropy seeds and a state-transition circuit configured to detect the sequestration of a first digital asset into a non-recoverable state. Sequestration generates a unique transaction identifier that triggers automated revelation logic to disclose the corresponding entropy seed. A synthesis engine, utilizing a transformation function, performs an atomic execution to generate a second digital asset based on a functional relationship between the disclosed seed and sequestered asset metadata.

30 Claims, 8 Drawing Sheets

AUTONOMOUS STATE SYNTHESIS VIA SEQUESTERED ENTROPY METHOD, SYSTEM, PRODUCT, AND APPARATUS

FIELD OF THE DISCLOSURE

The field of the invention is generally related to distributed computing and cryptographic data management systems. More specifically, it relates to an autonomous framework for deterministic state synthesis that utilizes sequestered digital inputs and pre-committed entropy to generate verifiable, non-manipulable data objects.

BACKGROUND OF THE DISCLOSURE

In existing distributed systems, a fundamental trust gap exists between the moment a user commits to a transaction and the moment the outcome is revealed. Conventional architectures often rely on pre-determined logic or external data sources to determine the result of a digital event. Because these results are frequently generated by centralized servers or third-party providers, technical vulnerabilities exist that may allow an operator or participant to observe an outcome or manipulate the timing of data disclosure before a transaction reaches finality. This lack of a rigorous temporal-cryptographic dependency can prevent digital environments from achieving true neutrality, as information asymmetry remains possible prior to a participant's full commitment to a state transition.

Furthermore, distributed environments frequently lack a mechanism to physically bind the removal of a digital asset to the specific entropy required to synthesize a successor state. Without a hard cryptographic link that enforces a sequential dependency, systems may struggle to provide a verifiable proof that a new data object was generated autonomously and uniquely for a specific event. As digital ecosystems scale, this often leads to state-management challenges where the creation of new assets is not programmatically anchored to a "point of no return," resulting in potential predictability or the exploitation of disclosure windows.

Moreover, current systems often face significant overhead when managing large-scale entropy requirements or multi-party coordination. Existing methodologies for entropy disclosure typically lack the efficiency to handle high-frequency registries or complex peer-matching conditions without inducing significant ledger state bloat or risking system deadlock. There remains a need for a verifiable framework for deterministic state synthesis that ensures cryptographic integrity, resource efficiency, and automated coordination across disparate network environments.

SUMMARY OF THE DISCLOSURE

The architecture described herein establishes what may be characterized as a proof of entropy system, wherein the integrity of a newly synthesized digital asset is cryptographically guaranteed by the proven existence of an entropy commitment that predates the asset's creation but remains undisclosed until a sequestration event is finalized.

The present disclosure relates to a technical framework for managing the evolution of digital states through a strictly sequenced cryptographic process. By integrating asset sequestration with pre-committed entropy revelation, the system establishes an immutable link between the removal of an existing data state and the synthesis of a new, deterministic successor. This architecture addresses the inherent vulnerabilities of traditional distributed systems by enforcing a point of no return that must be crossed before the parameters of a state transformation are disclosed, thereby ensuring the integrity and neutrality of the resulting data objects.

In one aspect, the present disclosure provides a distributed computing system for deterministic state synthesis that includes a persistent data ledger to store cryptographic commitments corresponding to non-disclosed entropy seeds. The system further includes a state-transition circuit to detect a sequestration event of at least one first digital asset into a non-recoverable ledger state, thereby generating a unique transaction identifier. An automated revelation logic programmatically discloses the non-disclosed entropy seed only upon verification of the identifier on the ledger, allowing a synthesis engine to generate a second digital asset via atomic execution of a transformation function using the disclosed seed and metadata attributes of the sequestered asset.

In another aspect, the present disclosure provides a computing device for executing verifiable state-transitions, utilizing a network interface to receive hashed commitments and a processor to generate sequestration commands to relocate digital assets to non-recoverable addresses. An asynchronous listener monitors the ledger for seed revelations to allow a synthesis module to calculate new data states.

In another aspect, the present disclosure provides a system for the automated deployment of deterministic state-transition environments using a template engine to define functional relationships, a commitment generator for entropy pools, and a deployment module to instantiate smart contracts linked to pre-funded asset vaults.

In yet another aspect, the present disclosure provides a method for autonomous state synthesis comprising storing cryptographic commitments, sequestering assets to generate unique identifiers, revealing seeds post-sequestration, and minting second digital assets based on functional relationships between seeds and metadata.

The present disclosure facilitates an unprecedented level of cryptographic integrity by ensuring a rigid sequential dependency between the destruction of data and the revelation of transformative parameters. By programmatically binding non-disclosed entropy seeds to unique transaction identifiers only after those identifiers are generated, the present disclosure eliminates the possibility of outcome manipulation or look-ahead attacks. This architectural constraint provides a provably neutral environment where neither the system operator nor the participant can predict the resulting state of a synthesized asset until a point of no return has been crossed through the sequestration of a first digital asset.

To ensure industrial-scale utility, the disclosure incorporates a master entropy root and derivation path generator architecture. This allows the system to derive an infinite series of unique seeds from a non-depleting source, supporting high-throughput environments without the overhead of individual seed management. Efficiency is further enhanced by a probabilistic uniqueness filter and collision resolution circuit, which utilize space-efficient data structures to minimize ledger state bloat by performing full-string validations only upon the detection of potential hash collisions.

The present disclosure enables institutional-grade transparency and solvency through the integration of continuous monitoring and automated auditing tools. By utilizing a solvency monitor and pre-funded vaults, the disclosure provides a guarantee that every sequestration event is backed by available resources for the subsequent synthesis.

For complex coordination, a temporal synchronization gate implements an asynchronous waiting state for multi-party sequestration. To maintain network liveness, a temporal watchdog is provided to programmatically divert stale or unmatched assets to a third-party sink, ensuring that sequestered value is never indefinitely stranded due to peer-matching failures.

For decentralized governance, the disclosure utilizes multi-signature threshold schemes and verifiable secret sharing protocols. By distributing entropy shares across a decentralized oracle network and requiring a threshold of block confirmations before revelation, the system mitigates risks associated with single-point failures. Furthermore, the inclusion of verifiable delay functions and hardware security modules creates a robust physical and temporal layer of security that protects the synthesis engine from computational exploitation, ensuring that the resulting data objects maintain a high degree of provenance and heritage.

The present architecture further establishes a scalable framework for Entropy as a Service (EaaS), transforming a cryptographic necessity into a shared utility. By decoupling the source of randomness from the final execution environment through a specialized root-level audit layer, the disclosure allows disparate networks to interoperate within a unified security model. This cross-chain capability ensures that the high-security characteristics of an originating network can be exported to facilitate asset synthesis on high-performance application chains, eliminating the problem of fragmented or "siloed" entropy. This standardized approach to verifiable state-transitions creates a global foundation for interoperability where the integrity of a digital asset is preserved regardless of the underlying settlement layer.

Furthermore, the system achieves unprecedented throughput through a sharded entropy model that facilitates the navigation of hyperscale data environments. By programmatically interpreting revealed entropy as coordinate indices within a multi-dimensional state-space, the disclosure enables the automated partitioning of search and indexing tasks. This creates a highly efficient Discovery-Consensus environment where search nodes can verify and claim specific data shards without the risk of overlapping efforts or resource collisions. The resulting architecture not only minimizes the computational footprint on the primary ledger but also provides a sustainable economic loop where participants are rewarded for precise discovery proofs. This enables the system to maintain a globally unique and non-colliding state-registry even as the volume of sequestered and synthesized assets scales toward an "infinite" data horizon.

DETAILED DESCRIPTION OF THE DISCLOSURE

Figure 1:
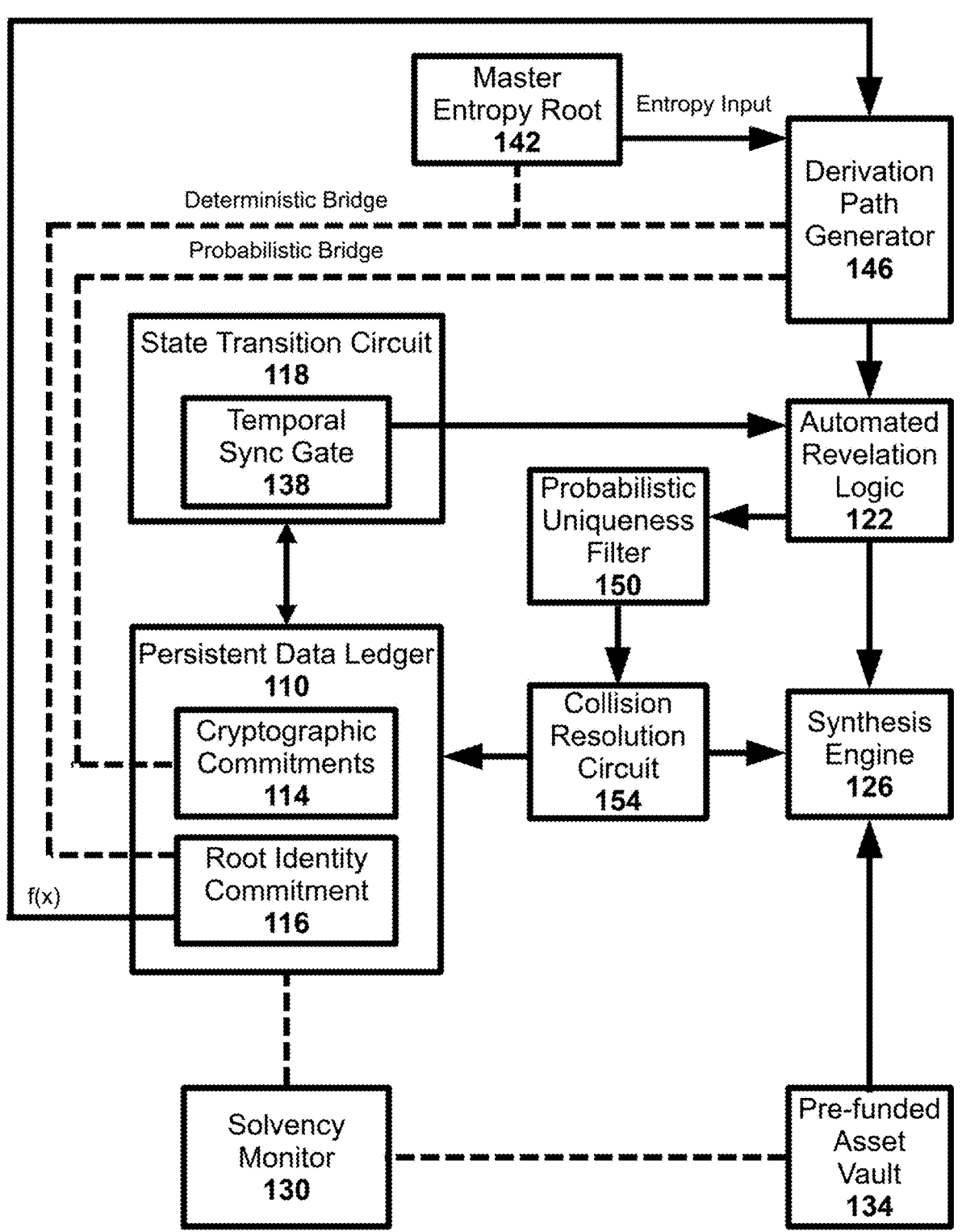
FIG. 1 is a block diagram illustrating a global system architecture for deterministic state synthesis, including a persistent data ledger, a sequestration circuit, a master entropy root, and a synthesis engine in accordance with the present disclosure.

The present disclosure will now be described with reference to the drawings, wherein like reference numerals are used to refer to like elements disclosed herein.

The following detailed description provides a comprehensive framework for a system and method configured to facilitate deterministic state synthesis through the controlled sequestration of digital assets and the subsequent revelation of cryptographically bound entropy. By establishing a verifiable link between the terminal state of a first asset and the generative birth of a second asset, the system ensures a high-integrity, automated transition environment suitable for a wide variety of decentralized and centralized applications.

The following interpretive definitions are provided to establish the broadest reasonable interpretation of the terms used throughout this disclosure and the appended claims. As used herein, the term digital asset, asset, or data object shall be interpreted broadly to encompass any unit of value, cryptographic token whether fungible or non-fungible, executable script, smart contract, virtual credential, encrypted data packet, or entry in a distributed or centralized ledger, or a modification of the state, attributes, or permissions associated with an existing data structure. The sequestration, burn, or transition of such an asset into a non-recoverable ledger state shall be interpreted to encompass any data condition on a persistent ledger where a digital asset is rendered permanently inaccessible, unusable, or untransferable by the original owner or any other entity, or the cryptographic invalidation of the asset's authority within its native registry. This includes, but is not limited to, relocation to a null address, the verifiable destruction of private keys, or the programmatic sequestration of the asset within an escrow contract that lacks a withdrawal or recovery function. Consequently, a sequestration event refers to any verifiable state transition on a ledger that moves an asset into such a non-recoverable state, thereby serving as a definitive trigger for the subsequent revelation of entropy.

The term persistent data ledger or ledger shall be understood to include any decentralized blockchain, directed acyclic graph (DAG), sidechain, state channel, distributed hash table (DHT), or centralized database capable of maintaining an immutable or verifiable record of state transitions, serving as the primary source of truth for the verification of sequestration events. Furthermore, the term circuit, module, engine, or logic gate shall encompass hardware-based logic such as FPGAs or ASICs, software-defined logic such as virtual machines or containerized scripts, firmware, or any combination of hardware and software configured to perform the described functional operations, specifically including decentralized computation environments where logic is executed across a plurality of disparate nodes.

Deterministic state synthesis shall be understood as a computational process where the resulting attributes and state of a new digital asset are derived through a fixed functional relationship with a revealed entropy seed and specific metadata attributes, ensuring that the same inputs will always yield the same output traits without the influence of real-time external randomness during the synthesis phase. These metadata attributes shall be interpreted broadly to include any data associated with a transaction or asset, such as block-height, account nonces, timestamps, and immutable trait data stored within an asset's original schema. To protect the integrity of this process, a temporal gate or temporal barrier shall be understood to include any mechanism that enforces a delay or sequence in data processing, including Verifiable Delay Functions (VDFs), block-height requirements, or timestamp-based logic, specifically designed to prevent look-ahead attacks or front-running of the entropy revelation.

The peer-matching condition and its associated logic buffer refer to an asynchronous gate or memory space configured to aggregate transaction identifiers from a plurality of independent addresses, wherein the logic buffer suppresses the initiation of entropy revelation until a predefined ratio or set of criteria for multiple sequestered assets is satisfied. Automated revelation logic shall encompass any combination of hardware security modules, trusted execution environments, or decentralized oracle networks configured to programmatically disclose or reconstruct a secret value upon the mathematical verification of a sequestration trigger. This reconstruction often involves an atomic execution, which shall be understood as an indivisible operation or sequence of operations that either completes in its entirety or fails completely, ensuring that the synthesis of a new asset and the corresponding state changes occur as a single logical unit.

A pre-funded vault refers to any programmatic pool of digital assets, liquidity, or data objects, whether maintained on a ledger or in a secure off-chain environment, that is designated for the fulfillment of the synthesis process. Upon fulfillment, a heritage record is generated, defined as an immutable cryptographic back-link or provenance proof embedded within a synthesized asset that uniquely identifies and points to the specific sequestration event from which the asset was derived. The non-disclosed entropy seed used in this process is defined as any secret numeric or data string that is withheld from the public domain and the synthesis engine until the precise moment the verification conditions are met.

The master entropy root or master root refers to a high-level cryptographic secret used as a non-depleting source for generating a plurality of unique, single-use entropy seeds through hardened, one-way derivation. The master root allows for the infinite expansion of the entropy pool without requiring the public registration of individual secret seeds, as each unique child seed is programmatically derived from the root using a specific transaction identifier or index as a derivation path. The disclosure of a child seed derived from the master root shall be understood as a non-reversible operation that does not compromise the security or the non-disclosed status of the master root itself, while the smart contract logic ensures that each derived seed is invalidated for future use after its initial revelation.

The derivation path generator refers to a deterministic logic layer configured to map a unique transaction identifier, account nonce, or ledger coordinate to a specific mathematical offset within the master entropy root. This mapping ensures that each child seed is bound to a singular sequestration event in a one-to-one relationship, preventing entropy reuse. To ensure the efficiency of this mapping, the system may employ a probabilistic uniqueness filter—defined as a space-efficient data structure, such as a Bloom filter or bit-map, configured to provide a high-probability verification of entropy freshness. This filter allows the system to detect potential duplicate derivation paths without maintaining an exhaustive registry of all prior transactions.

In the event that the probabilistic filter indicates a potential duplicate, a collision resolution circuit is activated. This circuit shall be understood as a secondary, high-fidelity verification logic configured to perform a full-string comparison against the persistent data ledger or a dedicated registry ledger. The dedicated registry ledger (or L0 registry) shall be interpreted as a specialized, high-throughput data availability layer or separate blockchain environment configured specifically to archive and index entropy revelation proofs, thereby offloading state-storage requirements from the primary settlement ledger.

The term solvency monitor shall be understood as an automated logic layer or invariant-checking circuit configured to verify that the quantity or value of assets available within a pre-funded vault is equal to or greater than the pending synthesis liabilities. This monitor acts as a programmatic circuit breaker that prevents the initiation of a sequestration event if the system cannot guarantee the immediate availability of a corresponding second digital asset upon revelation.

The terms hardware security module (HSM) and trusted execution environment (TEE) shall be interpreted broadly as secure computational environments that provide hardware-level isolation for sensitive data. An HSM refers primarily to a dedicated device or secure enclave for the generation and storage of the master entropy root, while a TEE refers to an isolated processing space where entropy revelation and asset synthesis occur. These terms shall encompass any isolated execution environment, whether physical, virtualized, or decentralized, that ensures the internal logic remains opaque to external observers and the host operating system.

An encrypted side-channel shall be understood as a secure, authenticated communication path—including but not limited to TLS, Noise protocol, or a point-to-point encrypted tunnel—specifically configured to facilitate the transmission of plain-text entropy seeds between a security module and an execution enclave. This channel ensures that entropy remains non-disclosed during transit, even if the underlying transport network or persistent data ledger is compromised.

The participant registry shall be understood as a whitelist, governance contract, or identity directory that manages and authenticates the entities authorized to hold secret shares or participate in the decentralized oracle network.

The input vector aggregator refers to a specialized data-structuring module configured to perform a deterministic concatenation or hashing of disparate data types, specifically combining the revealed entropy seed with sequestered asset metadata and nonces. This aggregator produces the final synthesis blueprint, which serves as the immutable input for the transformation function, ensuring that no element of the metadata can be omitted or altered during the transition.

The source state observer and relayer interface shall encompass any programmatic listener or data-transport agent—whether centralized or decentralized—configured to monitor a source network for finalized sequestration events and transmit the corresponding cryptographic proofs to a destination network. These components function as a trustless bridge, ensuring that the synthesis engine on a target ledger can verify the finality of an event on an originating ledger without direct access to the originating ledger's full state.

The asynchronous waiting room or waiting state refers to a persistent data buffer or logic state wherein a sequestered asset is held pending the fulfillment of additional system conditions or the arrival of a matching peer asset. The liveness of this waiting state is enforced by a temporal watchdog, defined as an automated monitor—such as a smart contract timer, block-height tracker, or oracle-driven reaper—configured to track the duration an asset remains in the waiting room. If a predefined temporal threshold is exceeded, the watchdog triggers a sink or redirection address. Such redirection shall be understood as a Terminal State Transition that satisfies the economic finality of the system by ensuring the original participant cannot reclaim the asset regardless of whether the asset is destroyed, reassigned, or held in perpetual escrow. This sink is defined as a programmatic destination where the sequestered asset is relocated to prevent system deadlock; such redirection may include, but is not limited to, a charitable treasury, a protocol reserve, or a designated null address, effectively removing the asset from the original participant's control to ensure the economic finality of the sequestration.

Referring to FIG. 1, a Global System Architecture 100 for deterministic state synthesis is illustrated. The architecture provides a high-integrity environment where a transition of data into a terminal state programmatically facilitates the generation of new, verifiable data objects.

The Persistent Data Ledger 110 serves as a verifiable registry for Cryptographic Commitments 114 and the Root Identity Commitment 116. The Persistent Data Ledger 110 may be characterized as any distributed state machine, directed acyclic graph (DAG), or immutable data store capable of providing finality for cryptographic events. The Cryptographic Commitments 114 represent hashed entropy values or state-commitments recorded in an accumulator or ledger-based storage prior to a synthesis event. To facilitate scalability, the system utilizes a Master Entropy Root 142 and a Derivation Path Generator 146. The Master Entropy Root 142 functions as a non-depleting source for derivation, while the Derivation Path Generator 146 maps unique event identifiers—such as transaction nonces or ledger coordinates—to specific offsets or child seeds.

The system employs a multi-bridge framework to establish verifiable provenance. In various embodiments, a Deterministic Bridge exists between a Root Identity Commitment 116 and a Derivation Path Generator 146. This configuration facilitates a Dual Anchor Relationship, utilizing a Private Anchor (such as the non-disclosed Master Entropy Root 142) and a Public Anchor (such as the Root Identity Commitment 116 or an equivalent cryptographic proof). By processing both anchors within the Derivation Path Generator 146, the system ensures the resulting seed is mathematically bound to a verifiable ancestry without requiring the disclosure of the underlying entropy source.

To maintain system integrity and prevent state bloat, the architecture incorporates a Probabilistic Uniqueness Filter 150 and a Collision Resolution Circuit 154, which collectively perform a guardrail function for the entropy pool. The Probabilistic Uniqueness Filter 150 comprises any space-efficient data structure or algorithm configured to perform rapid uniqueness checks on derivation paths or seeds. In instances where a potential duplicate is detected, the Collision Resolution Circuit 154 facilitates a higher-fidelity validation against the ledger or an associated registry. These elements function as a logical guardrail, ensuring that the Automated Revelation Logic 122 executes only upon confirmation of a unique state transition.

The State-Transition Circuit 118 comprises logic gates or programmatic filters configured to detect and validate the relocation of at least one first digital asset to a terminal, non-recoverable state. A Temporal Synchronization Gate 138—operating as an asynchronous accumulator—verifies the fulfillment of multi-party or multi-asset conditions by aggregating identifiers until a predefined threshold or temporal window is satisfied.

Upon confirmation of a trigger event and verification by the guardrail components (Probabilistic Uniqueness Filter 150 and Collision Resolution Circuit 154), the Automated Revelation Logic 122—which may be instantiated as a smart contract, hardware enclave logic, or decentralized script—discloses the specific entropy seed associated with the event. The Synthesis Engine 126, an isolated or secured execution environment, then processes a transformation function to derive the state of a Second Digital Asset 418.

To ensure operational solvency, a Solvency Monitor 130 provides a logic layer that verifies output liquidity or asset availability within a Pre-funded Asset Vault 134 relative to active sequestration liabilities. The Pre-funded Asset Vault 134 represents any programmatic escrow, liquidity pool, or data repository ensuring the system remains capable of fulfilling the state synthesis.

Figure 2A:
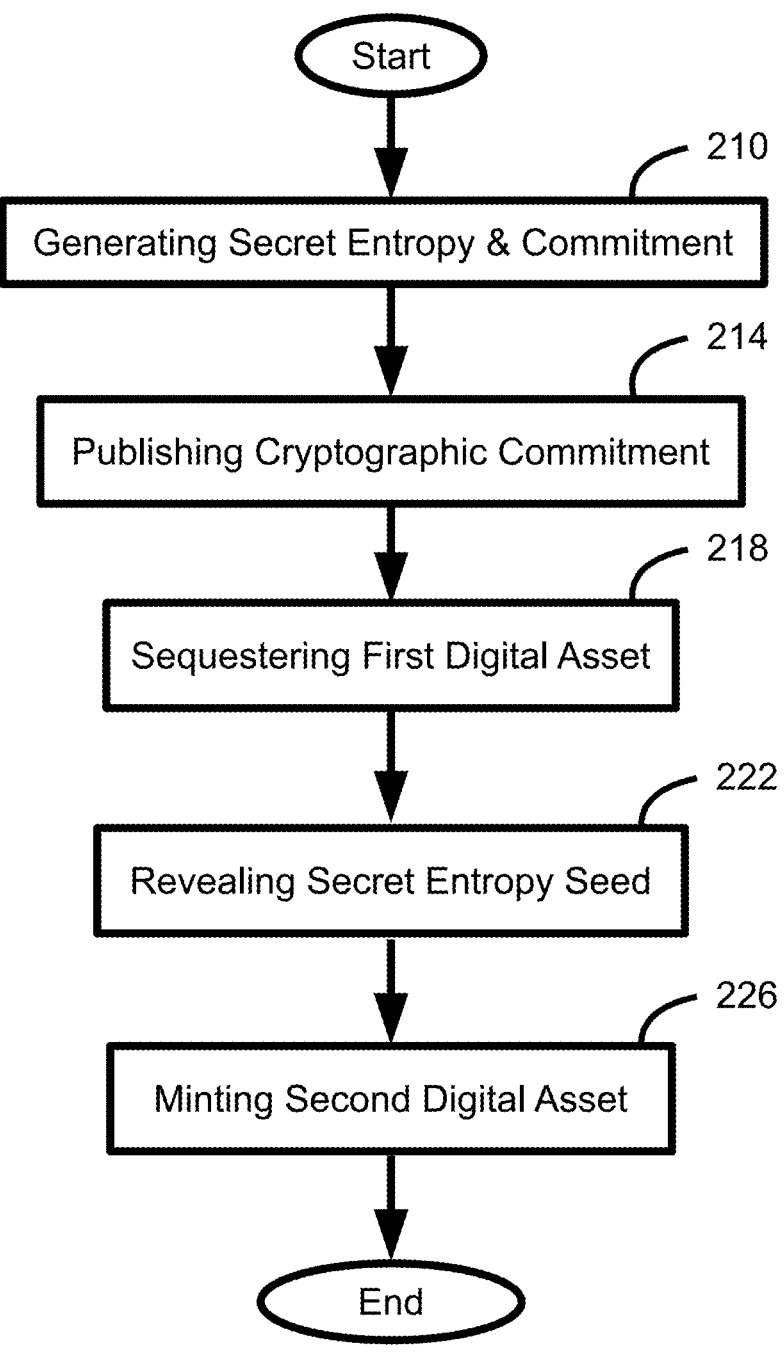
FIG. 2A is a flowchart illustrating the primary deterministic method for autonomous state synthesis, including the pre-publication of cryptographic commitments and the subsequent revelation of entropy seeds triggered by a verified sequestration event in accordance with the present disclosure.

Referring to FIG. 2A, a flowchart illustrates the primary method for autonomous state synthesis. This sequence defines the core deterministic logic of the system, ensuring that the outcome of a state transition is mathematically fixed yet remains non-disclosed until a specific ledger event occurs.

The process begins at step 210 with Generating Secret Entropy & Commitment. In this stage, the system resolves a specific entropy seed via the Master Entropy Root 142. Simultaneously, a cryptographic hash of this seed is produced to create a Cryptographic Commitment 114. This step establishes the "Preset Truth," where the functional "DNA" of the eventual output is determined prior to any external user interaction or ledger-based trigger.

At step 214, the system performs Publishing Cryptographic Commitment. The hashed commitment is recorded onto the Persistent Data Ledger 110 or a dedicated registry. By anchoring the hash publicly before the sequestration occurs, the system provides a verifiable "Public Anchor." This prevents the synthesis engine from retrospectively altering the entropy to suit a specific result, thereby ensuring total transparency and mathematical integrity.

At step 218, the system executes Sequestering First Digital Asset. This step represents the reception of a unique sequestration identifier resulting from the relocation of a first digital asset to a non-recoverable state. This event acts as the "Active Trigger" that bridges the pre-existing, non-disclosed logic to a real-world state change.

Following the verification of the sequestration event, the process moves to step 222, Revealing Secret Entropy Seed. The Automated Revelation Logic 122 programmatically discloses the plain-text seed that was previously hashed in step 210. Because the revelation is conditionally bound to the unique identifier generated in step 218, the system ensures that entropy is only disclosed for validated, irreversible state transitions.

Finally, at step 226, the system performs Minting Second Digital Asset. The Synthesis Engine 126 executes a transformation function that utilizes the revealed entropy seed and the metadata attributes of the sequestered first digital asset as primary inputs. This creates a second digital asset whose state is a deterministic result of the combined metadata of the original asset and the pre-committed entropy.

To ensure the "one-time-use" promise of each entropy seed remains scalable, the system may implement a dependent verification step utilizing a Probabilistic Uniqueness Filter 150. By performing a high-speed check against a Bloom filter or truncated hash registry, the system can instantaneously verify that a derivation path or seed has not been previously utilized. This approach significantly reduces the time and storage overhead associated with querying a massive, ever-growing ledger. Only upon a positive match in this filter does the system trigger a full-string validation via the Collision Resolution Circuit 154, thereby protecting the system against state bloat while maintaining the absolute uniqueness of every synthesis event.

Figure 2B:
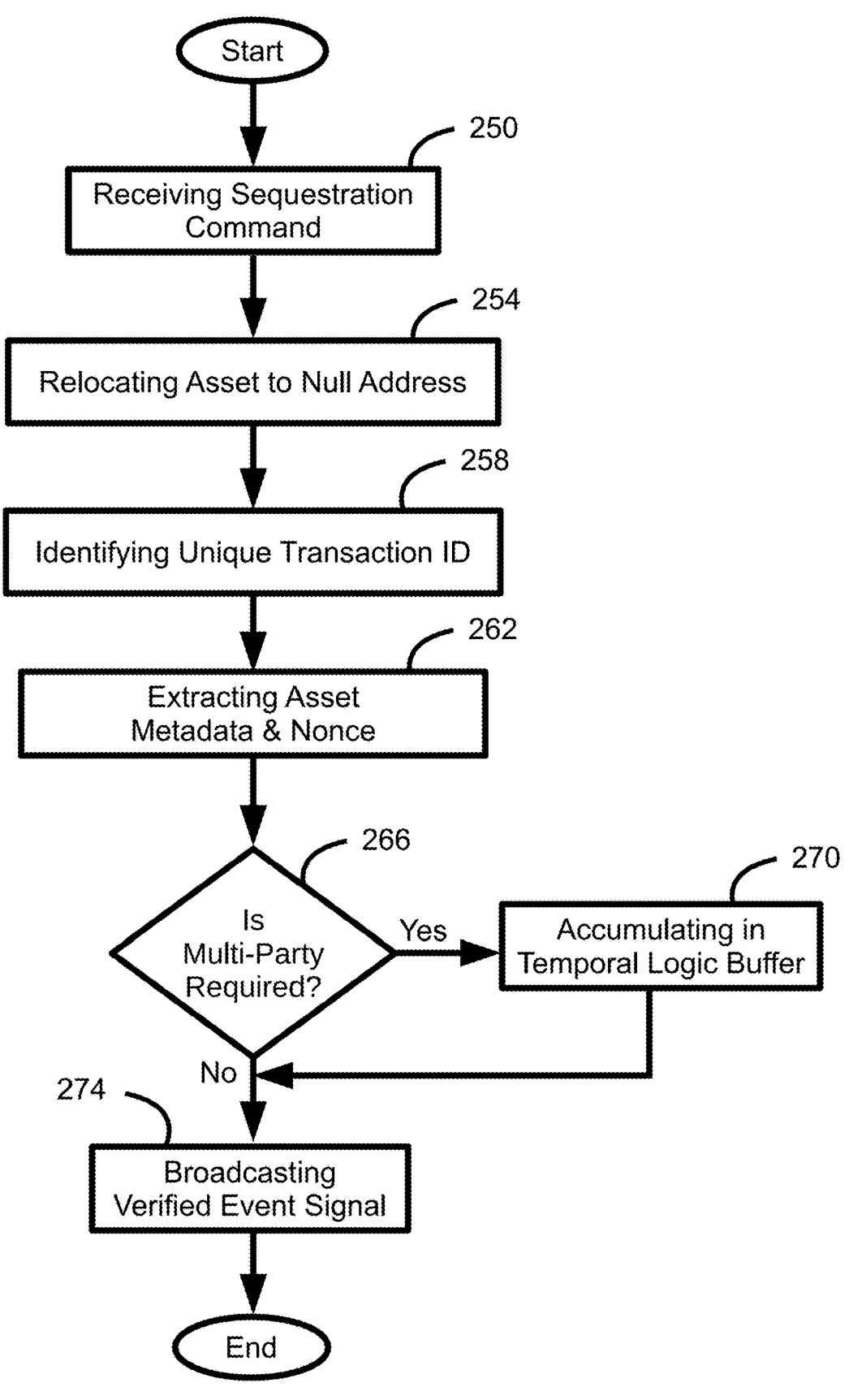
FIG. 2B is a flowchart illustrating the operational procedural steps for a sequestration event, including the relocation of assets to a non-recoverable state and the implementation of temporal synchronization gate logic for multi-party coordination as a prerequisite for broadcasting a verified event signal in accordance with the present disclosure.

Referring to FIG. 2B, a flowchart illustrating the operational procedural steps for the sequestration of at least one first digital asset is shown. This process is configured to ensure an irreversible commitment of state and the fulfillment of temporal conditions before the synthesis logic is finalized.

The flow begins at step 250 with Receiving Sequestration Command. This step involves parsing an initial trigger—such as a payload from a user-facing computing device 16—containing unique asset identifiers, owner signatures, and destination parameters for the intended synthesis. At step 254, the system proceeds with Relocating Asset to Null Address. This represents the irreversible execution of a "burn" or a state-lock on the Persistent Data Ledger 110, ensuring the asset can no longer be utilized or transferred within the source environment.

Following the relocation, the system performs step 258, Identifying Unique Transaction ID. This step involves capturing the specific cryptographic "receipt" or TXID generated by the ledger event in step 254. This identifier serves as the unique event signal required to resolve the coordinate within the Master Entropy Root 142. At step 262, the system performs Extracting Asset Metadata & Nonce, capturing immutable data and ledger-provided nonces to be utilized as the synthesis vector.

The process then encounters a logical branch at step 266, which poses the question: "Is Multi-Party Required?" During this step, the State-Transition Circuit 118 queries the Temporal Synchronization Gate 138 against the requirements set forth in a Peer-Matching Template 730.

If the condition for multi-party coordination is met, the process moves to step 270, Accumulating in Temporal Logic Buffer. This stage represents an asynchronous waiting state within the Temporal Synchronization Gate 138. In this step, the gate implements a sliding-window temporal gate logic, where the identified TXID is held in a buffer until all required peer inputs—as defined by the template—are confirmed on the ledger. This sliding window provides a dynamic period of block-height or time during which the peer-matching criteria must be satisfied to prevent indefinite sequestration.

If no multi-party condition is required, or once the sliding-window conditions in step 270 are successfully met, the flow proceeds to step 274, Broadcasting Verified Event Signal. This final step transmits the finalized identifier or collection of identifiers to the Automated Revelation Logic 122. This broadcast acts as the mandatory verification signal that triggers the Revealing Secret Entropy Seed (Step 222) and the subsequent synthesis described in FIG. 2A.

Figure 3:
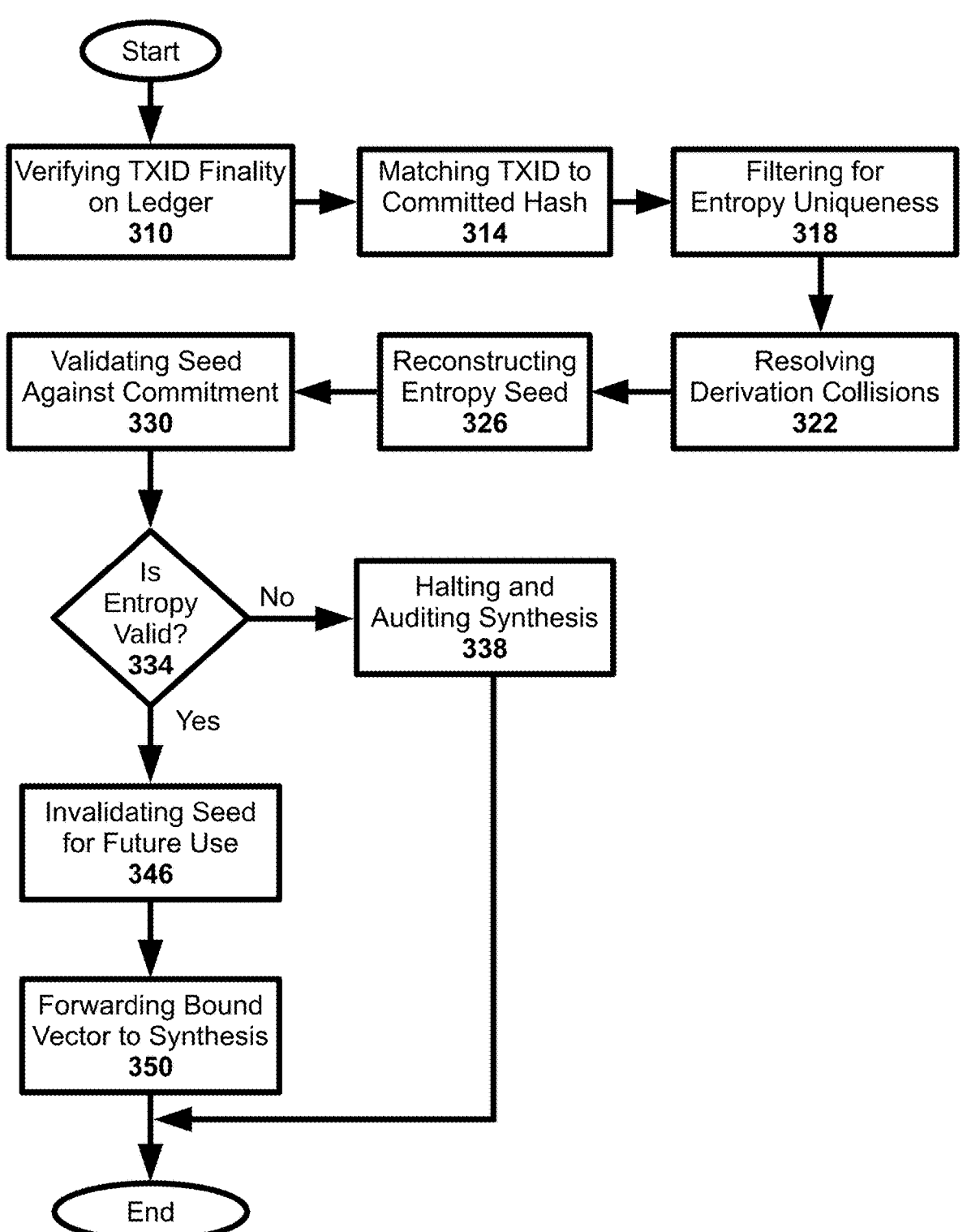
FIG. 3 is a flowchart illustrating the cryptographic commitment and revelation cycle, depicting probabilistic uniqueness filtering and the temporal relationship between pre-committed entropy seeds and post-sequestration disclosure in accordance with the present disclosure.

Referring to FIG. 3, a flowchart illustrating the procedural steps for the temporal gating and disclosure of entropy seeds is shown. This process facilitates a verifiable link between the randomness used for synthesis and a specific sequestration event (interchangeably referred to as a verifiable burn event), providing a functional barrier against unauthorized state manipulation.

The sequence begins at step 310 with Verifying TXID Finality on Ledger. This operation involves confirming that a sequestration transaction or equivalent data-destruction event has reached a threshold of consensus or finality on the Persistent Data Ledger 110, thereby preventing the processing of transient or non-finalized states. At step 314, the process continues with Matching TXID to Committed Hash, wherein the system identifies a pre-published Cryptographic Commitment 114 associated with the validated event identifier. In various configurations, this may include resolving a coordinate within the Master Entropy Root 142 via a Derivation Path Generator 146.

To maintain system scalability and integrity, the process executes step 318, Filtering for Entropy Uniqueness. This step utilizes the Probabilistic Uniqueness Filter 150 to execute a rapid check of the derivation path or seed. Should a potential conflict be identified, the process initiates step 322, Resolving Derivation Collisions, utilizing a Collision Resolution Circuit 154 to perform a high-fidelity validation against a ledger state or a Dedicated Registry Ledger 638. These steps function as a logical guardrail, serving as a circuit-breaking mechanism to halt the execution path if entropy reuse is detected.

Once uniqueness is confirmed, the system proceeds to step 326, Reconstructing Entropy Seed. This may be characterized by the aggregation of Partial Secret Shares 514 or the secure release of a plain-text seed from an isolated environment. At step 330, the system performs Validating Seed Against Commitment, where the revealed seed is mathematically verified against the anchor commitment identified in step 314.

This leads to a logical branch at decision diamond 334, posing the query: "Is Entropy Valid?" If the validation fails, the process diverts to step 338, Halting & Auditing Synthesis, where the execution is terminated and an entry is generated for an Audit Module 726.

If confirmed as valid, the flow proceeds to step 342, Binding Seed to Unique TXID, programmatically associating the entropy with the specific metadata of the trigger event. At step 346, the system performs Invalidating Seed for Future Use, updating a global state or registry to retire the seed. Finally, at step 350, the system performs Forwarding Bound Vector to Synthesis, transmitting the verified data package to the Synthesis Engine 126 for state creation.

Figure 4:
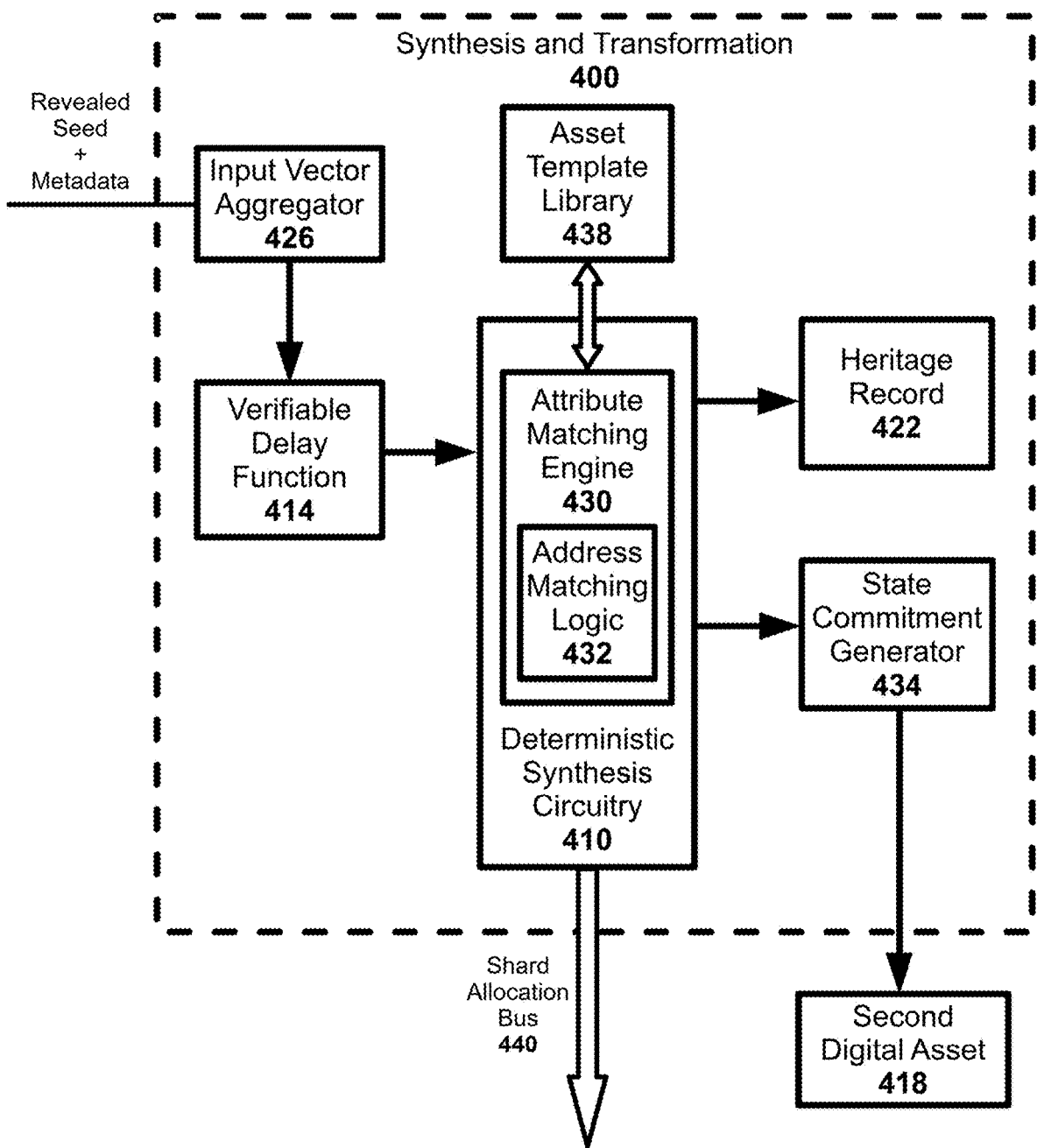
FIG. 4 is a block diagram of the synthesis engine illustrating the functional relationship between revealed entropy, verifiable delay functions, and address mapping logic for coordinate-based asset synthesis in accordance with the present disclosure.

Referring to FIG. 4, the Synthesis & Transformation 400 layer is illustrated, functioning as a specialized computational environment where the Second Digital Asset 418 is programmatically instantiated. This layer enforces a strict technological dependency where the output attributes are derived through the atomic execution of non-linear logic within a constrained execution path.

At the input stage of this layer, an Input Vector Aggregator 426 is provided. The Input Vector Aggregator 426 is a hardware-integrated or logical module configured to ingest multiple asynchronous data streams—including the revealed entropy seed, specific asset metadata, and a ledger-derived nonce—and bind them into a single, normalized input vector. This combined string serves as the immutable, high-entropy blueprint for the subsequent transformation. To ensure cryptographic fairness and prevent information asymmetry, a Verifiable Delay Function (VDF) 414 is implemented as a sequential computational barrier. The VDF 414 prevents "look-ahead" attacks by requiring a verifiable proof of sequential computation time to elapse before the input vector is released to the core synthesis logic.

The core of this layer is the Deterministic Synthesis Circuitry 410. Rather than a generic algorithm, the Circuitry 410 represents a secured logic gate configuration—such as a specialized smart contract executor or a trusted execution environment—that utilizes an Attribute Mapping Engine 430. This engine applies a deterministic mapping algorithm to the input vector to derive specific rarity tiers, functional permissions, or aesthetic properties. The Attribute Mapping Engine 430 operates in communication with an Asset Template Library 438, which provides the pre-defined schemas ensuring the output is compatible with the destination ecosystem. In high-assurance embodiments, the Circuitry 410 is configured to generate a zero-knowledge proof of this transformation, permitting third-party validation of the resulting state without exposing the underlying secret entropy. The Deterministic Synthesis Circuitry 410 can utilize a deterministic chaotic function to ensure that infinitesimal variations in the entropy seed result in divergent, non-linear output states.

During the synthesis process, the system generates a Heritage Record 422. This record functions as an immutable provenance back-link, cryptographically embedded within the new asset's data structure, pointing directly to the unique transaction identifier (TXID) of the original sequestration event (or verifiable burn event). Finally, a State Commitment Generator 434 performs a final cryptographic hash of the synthesized data, resulting in the Second Digital Asset 418, which is then ready for finalization on the target state-machine or destination network.

The Deterministic Synthesis Circuitry 410 is conductively coupled to a Shard Allocation Bus 440. Internally, the Circuitry 410 comprises Address Mapping Logic 432, which is configured to route the high-entropy input vector to the Shard Allocation Bus 440. This configuration allows the system to toggle between an asset-synthesis mode and a discovery-consensus mode, where the latter utilizes the Shard Allocation Bus 440 to distribute deterministic search coordinates to external network participants such as a network of search nodes, ensuring the search assignment is cryptographically bound to the entropy. To prevent reuse or manipulation of the assignment, the Shard Allocation Bus 440 is further configured to emit a one-time-use discovery token that invalidates the specific entropy-coordinate pair upon the successful verification of a search result.

Figure 5:
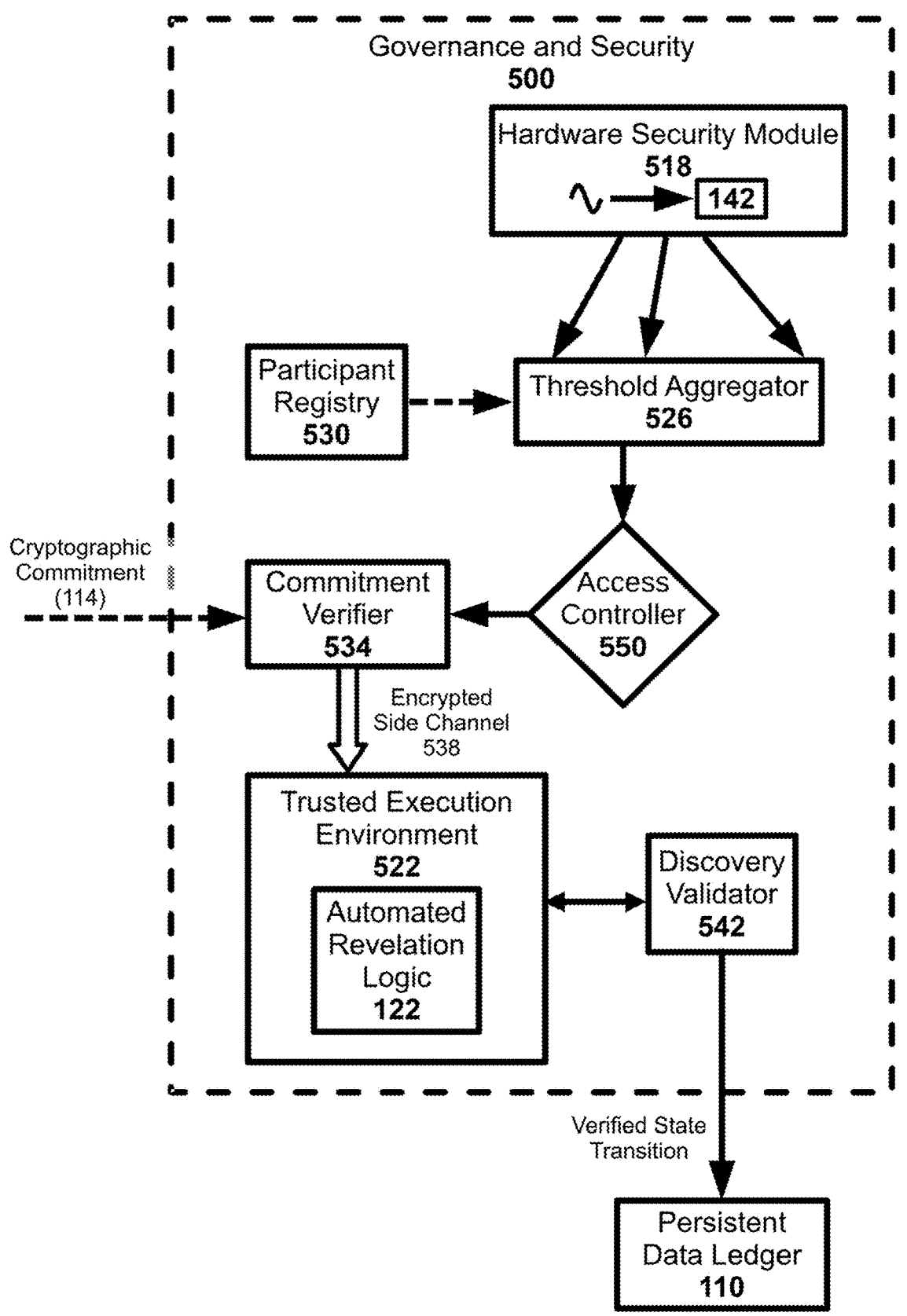
FIG. 5 is a block diagram illustrating a hardware security module, an access controller, and a decentralized oracle network utilizing a threshold scheme for secure entropy reconstruction in accordance with the present disclosure.

Referring to FIG. 5, the Governance & Security 500 layer is illustrated, which provides the hardware-enforced and decentralized security framework for the system. This layer is responsible for the secure generation, storage, and reconstruction of the entropy seeds required for deterministic synthesis.

At the core of the trust model is the Hardware Security Module (HSM) 518. The HSM 518 is a high-assurance hardware device comprising one or more entropy transducers configured to harvest true environmental chaos—specifically thermal noise fluctuations and quantum shot noise—internal to the module's circuitry. These physical fluctuations can be digitized and distilled into a Master Entropy Root 142, if need be, ensuring the root is a deterministic snapshot of an irreproducible physical state. By anchoring the Master Entropy Root 142 to these internal physical sensors, the system ensures that the resulting seeds cannot be forecasted or replicated by any external algorithmic model.

The management of these nodes is handled by the Participant Registry 530, which maintains a whitelist of authorized participants through a governance contract. When a synthesis event is triggered, the nodes submit their shares to a Threshold Aggregator 526. The Threshold Aggregator 526 is a logical module that collects the required number of shares (e.g., a k-of-n threshold) to reform the specific child entropy seed.

To maintain the technical integrity and sybil-resistance of the system, an Access Controller 550 may optionally gate the reconstruction process. The Access Controller 550 is configured to verify a computational credit requirement—such as a validator's hardware-attestation or a protocol-specific cryptographic authorization-prior to allowing the Threshold Aggregator 526 to release the reconstructed seed. This prevents resource exhaustion attacks and ensures that the disclosure of entropy remains a throttled, verifiable event within the network.

To ensure the reconstructed seed has not been tampered with, a Commitment Verifier 534 is employed. The Commitment Verifier 534 is a specialized circuit that checks the reconstructed seed against the original Cryptographic Commitment 114 published on the ledger. Once verified, the seed is transmitted via an Encrypted Side-Channel 538 directly into a Trusted Execution Environment (TEE) 522.

The TEE 522 is a secure processor enclave where the seed is revealed and the asset synthesis occurs in a private, isolated memory space. This architecture ensures that the Automated Revelation Logic 122 remains opaque, such that even system administrators or node operators cannot observe the raw entropy during the revelation and synthesis process.

In discovery-consensus embodiments, the Governance & Security 500 layer further comprises a Discovery Validator 542. The Discovery Validator 542 is conductively coupled to both the TEE 522 and the persistent data ledger. The Discovery Validator 542 is configured to receive a search result from an external node and perform a cryptographic comparison between said result and a target state proof generated within the TEE 522. By verifying that the data retrieved from a specific registry coordinate matches the deterministic expectation of the entropy seed, the Discovery Validator 542 confirms the successful completion of a search task before triggering any associated state updates. The Discovery Validator 542 can be configured to maintain state-finality within a chaotic network topology, where peer-node availability is stochastic and non-guaranteed.

Figure 6:
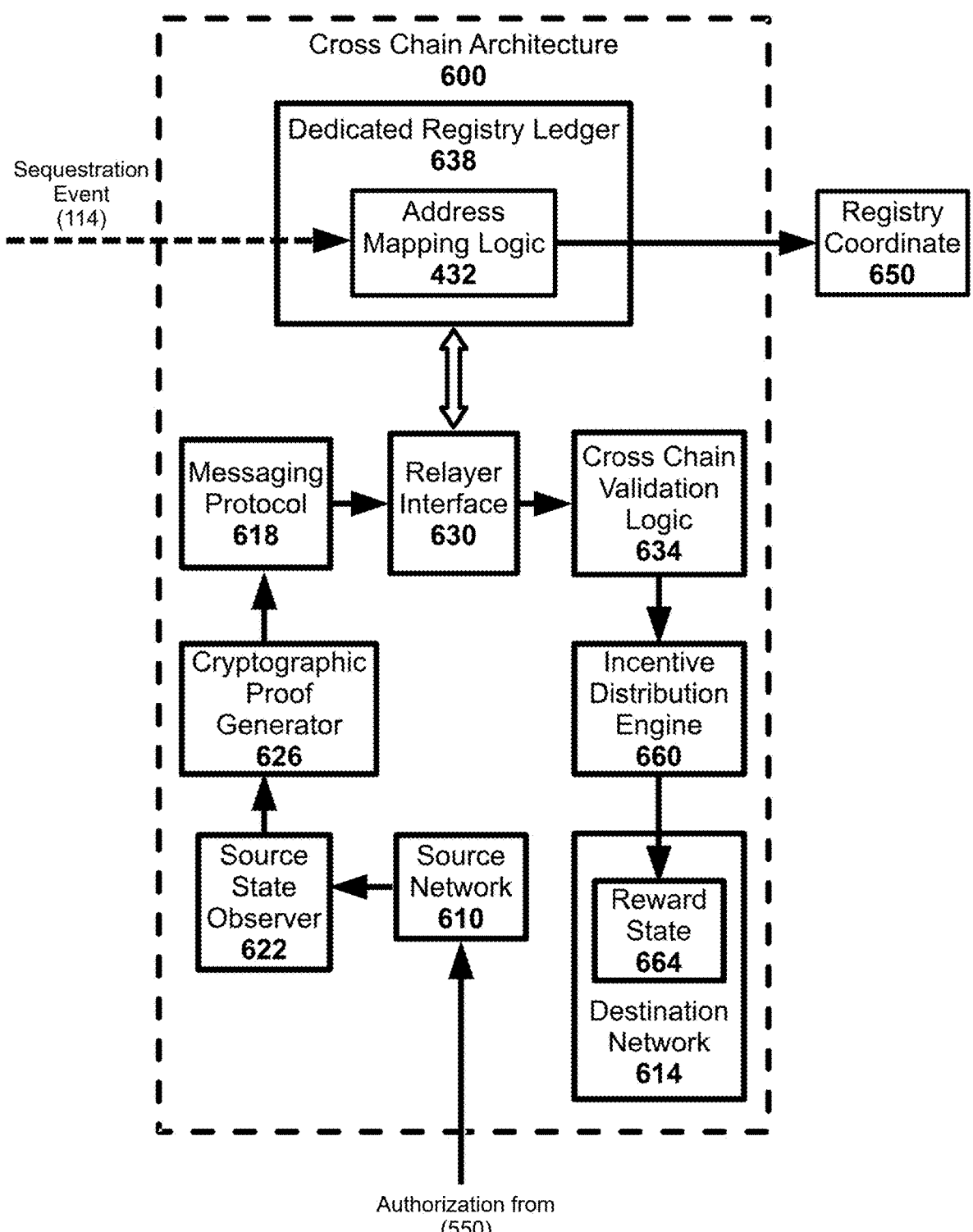
FIG. 6 is a block diagram illustrating a cross-chain architecture, including a dedicated registry ledger and an incentive distribution engine for managing state synthesis and reward allocation across disparate networks in accordance with the present disclosure.

Referring to FIG. 6, the Cross-Chain Architecture 600 is illustrated, which defines the multi-network environment facilitating state synthesis across disparate ledgers. This architecture ensures that a sequestration event on a first network can be verified and utilized as an atomic trigger for synthesis on a second, independent network or execution environment.

The process involves a Source Network 610 (Ledger A), which serves as the originating state machine where the sequestration event is recorded and finalized. Monitoring this network is a Source State Observer 622, which may comprise a specialized node, an oracle service, or a light-client listener configured to detect finalized unique sequestration identifiers that meet predefined criteria. Once a valid event is detected, a Cryptographic Proof Generator 626 is engaged. This module produces a verifiable certificate of the event—such as a Merkle Proof, a Zero-Knowledge Proof (ZKP), or a state-root commitment—which proves the state change on the Source Network 610 without requiring the destination network to process the entire source transaction history.

The transport of this data is handled by a Messaging Protocol 618, which may utilize a variety of interoperability standards or transport layers. A Relayer Interface 630 acts as the gateway that submits this proof, along with the sequestered metadata and nonces, to the Destination Network 614 (Ledger B).

To ensure global uniqueness and prevent entropy reuse in a multi-network environment, the architecture may include a Dedicated Registry Ledger 638. This specialized registry serves as a consolidated reference for storing entropy revelation proofs and indexing the Derivation Path Generator 146 states across all connected networks. In discovery-consensus embodiments, the Dedicated Registry Ledger 638 further functions as the indexing authority for an "infinite" data space, where the Address Mapping Logic 432 (from FIG. 4) outputs a specific Registry Coordinate 650. This Registry Coordinate 650 defines a precise shard or data-partition within the ecosystem that is assigned to a search node for indexing or verification. The Dedicated Registry Ledger 638 interfaces with the Access Controller 550, ingesting validator credentials to authorize the Address Mapping Logic 432, providing real-time verification of participant credentials, computational stakes, or credit balances required to authorize the reconstruction of entropy seeds. By utilizing the Dedicated Registry Ledger 638, the system can perform a global uniqueness check for derivation path collisions and Registry Coordinate 650 assignments, even when the source and destination networks are disparate. This registry functions as a 'L0' or root-level audit layer to maintain the 'one-time-use' integrity of the entropy seeds and search assignments across the entire ecosystem.

Upon arrival at the Destination Network 614, the data is processed by the Cross-Chain Validation Logic 634. This logic verifies the cryptographic proof against the known state-root or consensus rules of the Source Network 610. Only after the Cross-Chain Validation Logic 634 confirms the authenticity and finality of the sequestration on Ledger A does it release the trigger to initiate the synthesis of the Second Digital Asset 418 or finalize the search task. In discovery-consensus embodiments, the validation of a successful search task triggers the Incentive Distribution Engine 660. The Incentive Distribution Engine 660 is a programmatic logic layer configured to calculate and allocate a Reward State 664, comprising computational credits or protocol rewards, to the Destination Network 614 for distribution to participating search nodes, effectively closing the economic loop of the discovery process. This transmission of the Reward State 664 prevents 'double-minting' and ensures that the total supply, reward distributions, and state transitions across the global architecture remain balanced and mathematically sound.

Figure 7:
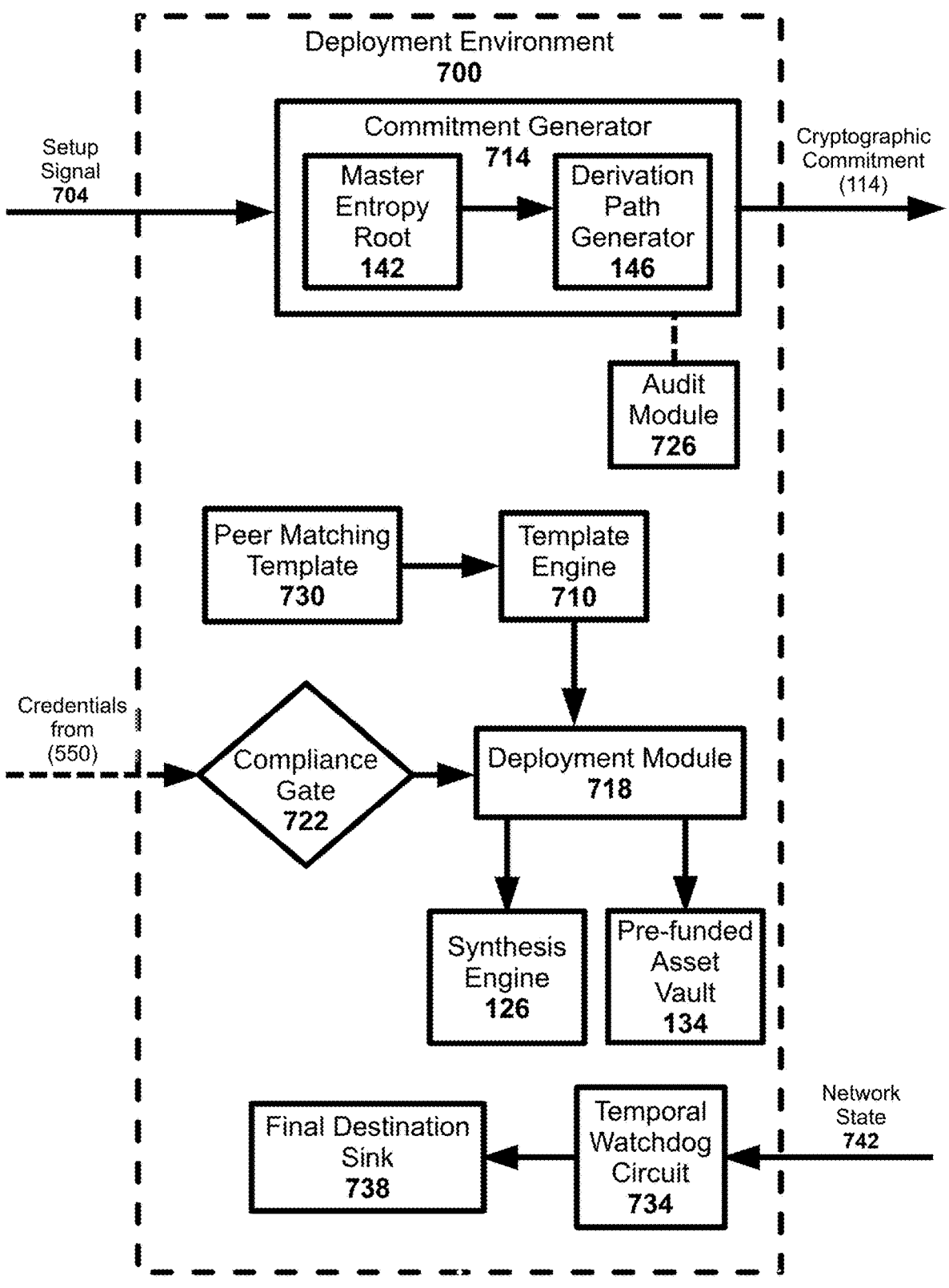
FIG. 7 is a block diagram illustrating an automated deployment environment, including a peer-matching template engine, a temporal watchdog circuit, and a final destination sink for the redirection of unmatched sequestered assets to ensure economic finality in accordance with the present disclosure.

Referring to FIG. 7, the Deployment Environment 700 is illustrated, which serves as the administrative factory for instantiating the various components of the synthesis ecosystem. The environment is initialized via a Setup Signal 704, which provides the configuration parameters required for system operators or autonomous protocols to define the functional relationship between sequestered assets and their synthesized outcomes.

Central to this environment is the Template Engine 710. The Template Engine 710 is a configuration tool used to define the deterministic rules and outcome ranges for the synthesis process, ensuring that the transformation logic adheres to specific project parameters. In coordination with the template logic and responsive to the Setup Signal 704, a Commitment Generator 714 is provided. The Commitment Generator 714 performs an automated process for creating entropy pools and their corresponding Cryptographic Commitments 114, which are then published to the ledger to establish the deterministic foundation of the system. In scalable embodiments, this generator initializes the Master Entropy Root 142 to allow for algorithmic seed derivation via the Derivation Path Generator 146.

The orchestration of the system's various smart contracts, execution logic, and escrow accounts is handled by the Deployment Module 718. This module is responsible for instantiating the necessary codebases on the target networks and linking the Pre-funded Asset Vault 134 to the Synthesis Engine 126. To ensure regulatory and operational compliance, a Compliance Gate 722 is integrated into the flow. The Compliance Gate 722 is a logic layer that may require verified identity credentials (e.g., from Access Controller 550), whitelisted addresses, or specific reputation-score thresholds before a sequestration command is accepted by the system.

For ongoing transparency, the environment includes an Audit Module 726. The Audit Module 726 maintains a public transparency log that explicitly maps every revealed seed back to its triggering unique sequestration identifier. This allows any observer to verify that the synthesis was performed according to the protocol rules and that no seeds were reused or manipulated.

Furthermore, a Peer-Matching Template 730 is provided as a configurable rule-set to define the specific ratios, asset classes, and quantities required for a multi-user synthesis event. This template functions as a configuration file that dictates the operational parameters for the Temporal Synchronization Gate 138 during the sequestration flow. To prevent indefinite system deadlock in multi-party scenarios, the environment includes a Temporal Watchdog Circuit 734. The Temporal Watchdog Circuit 734 ingest a Network State 742 feed—which may comprise real-time block-heights, timestamps, or ledger state updates—to monitor the duration of the asynchronous waiting state within the sliding window of the gate.

If a predefined temporal threshold or block-height defined by the Network State 742 elapses without a matching peer event, the watchdog programmatically diverts the sequestered assets to a Final Destination Sink 738. This redirection to a Final Destination Sink 738—which may comprise a third-party address, a null address, a community treasury, a recovery escrow, or other known final destination—ensures economic finality by permanently isolating the assets from the original participants in the event of a coordination failure. These combined elements ensure that the deployment environment can instantiate a secure, compliant, and fully autonomous state-transition system.

The system and methods disclosed herein are applicable across a broad spectrum of network and infrastructure configurations. In one embodiment, the disclosure facilitates cross-chain asset migration as illustrated in FIG. 6, where a first digital asset is sequestered on a high-fee or high-security Layer 1 network and a corresponding high-utility asset is synthesized on a disparate Layer 2 or specialized application-chain. In such embodiments, a Dedicated Registry Ledger 638 may be employed as a specialized L0 data availability layer to maintain a global, interoperable record of entropy revelation proofs across disparate networks, ensuring that the Master Entropy Root 142 remains secure and unique regardless of the settlement layer used. Furthermore, the architecture may be practiced as a state-compression or rollup mechanism, wherein a plurality of disparate data objects are sequestered to synthesize a single, compressed proof-based asset 418, thereby optimizing space on the persistent data ledger 110. The multi-party decision logic 266 additionally enables atomic swap and escrow functionalities, ensuring that synthesis is only triggered by the revelation logic 122 once the temporal synchronization gate 138 confirms that all participating entities have fulfilled their respective sequestration requirements.

At the application and engine level, the disclosure provides a framework for deterministic functional synthesis. In gaming and generative NFT environments, the verifiable delay function 414 and attribute mapping engine 430 are utilized to ensure that the traits of a synthesized asset cannot be predicted or manipulated by network participants or block producers. Beyond entertainment, the system may be practiced for dynamic credentialing, wherein an expired or revoked identity credential is sequestered to trigger the synthesis of a refreshed, cryptographically updated credential 418 that maintains a provenance link via the heritage record 422. Similarly, the engine may be utilized for resource tokenization, such as burning utility credits to synthesize localized access tokens for secure compute or storage environments. These processes are further applicable to specialized financial instruments, such as verifiable sealed-bid auctions where the sequestration circuit 118 locks bidder collateral and the temporal watchdog 734 enforces economic finality by diverting assets to a final destination sink 738 in the event of non-disclosure.

From a governance and compliance perspective, the deployment environment 700 acts as a programmable factory for regulated and decentralized systems. The compliance gate 722 allows for the integration of regulatory exit gates, ensuring that sequestration events only trigger synthesis when verified identity conditions are met. The audit module 726 provides a mechanism for transparent oversight, allowing regulators or users to verify a 1:1 ratio between birthed assets and their destroyed predecessors. Furthermore, in decentralized autonomous organization embodiments, the peer-matching template 730 may be configured to require a specific quorum of sequestered voting power before a finalized consensus asset is synthesized. To maintain network liveness and prevent capital stagnation in these coordination environments, a Temporal Watchdog Circuit 734 may be configured to monitor the sliding-window temporal gate and programmatically divert stale or unmatched sequestered assets to a Third-Party Sink 738—or other protocol-defined redirection address—if a defined temporal threshold elapses without the fulfillment of the matching criteria.

The embodiments described herein are provided by way of example and not by way of limitation. It will be understood by those skilled in the art that the present disclosure may be practiced in a wide variety of computing environments beyond the specific examples of blockchains or distributed ledgers. For instance, the persistent data ledger may include any centralized or decentralized database, cloud storage environment, or distributed file system capable of maintaining a verifiable state transition. The sequestration of an asset may include not only the transfer to a null address but also the encryption of data where the decryption keys are destroyed, the physical destruction of hardware, or the programmatic locking of a software license. This framework extends to secure communication protocols where the revealed entropy serves as a pre-committed session key, as well as transaction ordering systems where revelation occurs only after a batch of transactions is sequestered to prevent front-running.

To optimize performance in these varied environments, the system may utilize a Probabilistic Uniqueness Filter 150 to perform rapid, low-overhead entropy checks, transitioning to a Collision Resolution Circuit 154 only when a potential duplicate is detected. Furthermore, while the second digital asset is frequently described as a token or NFT, it should be interpreted to include any digital data object, including but not limited to, executable code, access permissions, encrypted files, streaming data rights, or entries in a physical-world registry. The transformation function may comprise any deterministic algorithm, including artificial intelligence models, machine learning inference engines, or simple mathematical mappings, provided that the output remains reproducible based on the revealed entropy seed.

The hardware components described, such as the HSM and TEE, represent the preferred embodiment for high-security applications; however, the logic of the invention may be executed in software-only environments using multi-party computation, zero-knowledge proofs, or other cryptographic obfuscation techniques. The steps of the flowcharts in FIGS. 2A, 2B, and 3 may be performed in different orders, and certain steps may be omitted or combined depending on the specific network requirements. Furthermore, the system may be configured to handle high-frequency or infinite registry requirements through diverse state-management architectures. In one embodiment, the system utilizes the Master Entropy Root 142 to derive seeds algorithmically. In an alternate or complementary embodiment, the system utilizes a Probabilistic Uniqueness Filter 150 to manage an expansive registry of discrete entropy seeds. To optimize storage and computational efficiency on the Persistent Data Ledger 110, the system may store entropy seeds or their commitments as truncated hashes. In such embodiments, the Collision Resolution Circuit 154 serves as a high-fidelity verification layer, triggered only when the filter identifies a potential hash collision, thereby allowing the system to maintain a globally unique entropy pool with minimal data footprint.

The architecture further contemplates a recursive and hyperscale state-space environment wherein the synthesized outcomes of a first process may serve as the input vectors or sequestration triggers for subsequent, higher-order synthesis events. In such recursive synthesis embodiments, the Address Mapping Logic 432 and Shard Allocation Bus 440 may be configured to orchestrate a distributed indexing network, where the Registry Coordinate 650 defines a granular data partition for autonomous search nodes. This facilitates the creation of a discovery-consensus economy, where the system autonomously generates, assigns, and verifies computational tasks based on the revelation of the entropy seeds. Furthermore, the Incentive Distribution Engine 660 is configured to interface with these autonomous search nodes to provide real-time economic finality for decentralized search operations. By decoupling the entropy source from the final execution environment via the Dedicated Registry Ledger 638, the system establishes a scalable L0-audit layer capable of governing an infinite state-space across an arbitrary number of interconnected networks, including legacy systems, contemporary blockchains, and future autonomous execution environments.

Although the disclosure has been shown and described with respect to a certain preferred aspect or aspects, it is obvious that equivalent alterations and modifications will occur to others skilled in the art upon the reading and understanding of this specification and the annexed drawings. In particular regard to the various functions performed by the above-described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the disclosure. In addition, while a particular feature of the disclosure may have been described above with respect to only one of several illustrated aspects, such feature may be combined with one or more other features of the other aspects, as may be desired and advantageous for any given or particular application.

The description herein with reference to the figures will be understood to describe the present disclosure in sufficient detail to enable one skilled in the art to utilize the present disclosure in a variety of applications and devices. It will be readily apparent that various changes and modifications could be made therein without departing from the spirit and scope of the disclosure as defined in the following claims.

I claim:

1. A distributed computing system for deterministic state synthesis, comprising:
   a persistent data ledger configured to store at least one cryptographic commitment, each commitment corresponding to at least one non-disclosed entropy seed;
   a state-transition circuit configured to detect a sequestration event of at least one first digital asset into a non-recoverable ledger state, wherein the sequestration event generates a unique transaction identifier;
   an automated revelation logic configured to programmatically disclose the non-disclosed entropy seed only upon verification of the unique transaction identifier on the persistent data ledger; and
   a synthesis engine comprising deterministic transformation circuitry configured to generate a second digital asset by applying a non-linear mapping function to the disclosed entropy seed and metadata attributes of the sequestered first digital asset as input parameters to determine a resulting state of the second digital asset, wherein the cryptographic commitment is finalized on the persistent data ledger prior to the sequestration event.

2. The system of claim 1, comprising a solvency monitor configured to verify that resources within a pre-funded vault are sufficient to meet an active sequestration liability associated with the second digital asset and log a cryptographic proof of solvency prior to the sequestration event.

3. The system of claim 1, wherein the non-linear mapping function is an immutable protocol rule stored on the persistent data ledger that defines a deterministic outcome range and writes a heritage record into the second digital asset comprising a provenance proof of the sequestered first digital asset.

4. The system of claim 1, wherein the non-disclosed entropy seed is programmatically bound to the unique transaction identifier only after the generation of the unique transaction identifier, such that the entropy seed is cryptographically invalidated for use with any other transaction identifier.

5. The system of claim 1, wherein the second digital asset is selected from a group consisting of: a non-transferable soulbound token, a cryptographic access credential, a verifiable reputation score, and a digital object representing a physical commodity interest.

6. The system of claim 1, wherein the state-transition circuit is configured to monitor a plurality of sequestration events from a plurality of independent peer addresses, and wherein the synthesis engine triggers the generation of the second digital asset only upon the fulfillment of a peer-matching condition defined in a logic buffer.

7. The system of claim 6, wherein the logic buffer is configured to implement a sliding-window temporal gate that establishes an asynchronous waiting state, such that the peer-matching condition must be satisfied within a predefined number of blocks to prevent the indefinite sequestration of the first digital asset.

8. The system of claim 7, further comprising a temporal watchdog circuit configured to monitor the duration of the asynchronous waiting state, wherein the state-transition circuit is configured to programmatically divert the sequestered first digital asset to a third-party sink address if a predefined temporal threshold elapses without a matching second sequestration event.

9. The system of claim 1, wherein the automated revelation logic requires a threshold of block confirmations on the persistent data ledger following the sequestration event before disclosing the entropy seed.

10. The system of claim 1, wherein the automated revelation logic comprises a multi-signature threshold scheme requiring partial secret shares from a plurality of independent nodes to reconstruct the non-disclosed entropy seed via a verifiable secret sharing protocol.

11. The system of claim 1, wherein the state-transition circuit is configured to enforce a strict one-to-one mapping between the unique transaction identifier and a derivation path from a master entropy root, and wherein the synthesis engine comprises a circuit breaker configured to halt execution if a previously utilized derivation path is re-submitted for a subsequent synthesis event.

12. The system of claim 11, wherein the circuit breaker comprises a probabilistic data structure configured to perform a preliminary uniqueness check of a derivation path corresponding to the unique transaction identifier, and wherein the synthesis engine executes a full-string validation against the persistent data ledger only upon a positive indication from the probabilistic data structure.

13. The system of claim 1, wherein the persistent data ledger and the synthesis engine operate on a modular blockchain architecture comprising a settlement layer for the sequestration event and a separate data availability layer for the storage of the non-disclosed entropy seeds.

14. The system of claim 1, wherein the automated revelation logic is configured to emit a verifiable revelation proof to a dedicated registry blockchain, said dedicated registry blockchain serving as a consolidated reference for entropy uniqueness and state-transition auditing.

15. The system of claim 1, wherein the synthesis engine maintains a truncated hash registry of previously disclosed entropy seeds to minimize ledger state bloat, and wherein the automated revelation logic comprises a collision-resolution protocol configured to perform a full-string verification against the persistent data ledger only upon the detection of a matching truncated hash.

16. The system of claim 1, wherein the second digital asset is a localized access token synthesized via resource tokenization, and wherein the localized access token comprises a deterministic data state authorizing access to a secure resource environment within a distributed computing architecture.

17. The system of claim 1, wherein the synthesis engine is configured to generate a zero-knowledge proof of the non-linear mapping function, thereby verifying the resulting state of the second digital asset while maintaining the cryptographic privacy of the metadata attributes of the sequestered first digital asset.

18. The system of claim 1, wherein the synthesis engine is configured for recursive state synthesis, such that the second digital asset generated by a first synthesis event is subsequently sequestered as the first digital asset for a second, higher-order synthesis event.

19. A computing device for executing verifiable state-transitions, comprising:

a network interface configured to receive a plurality of hashed commitments corresponding to secret entropy seeds;

a physical processor configured to select a specific hashed commitment from the plurality of hashed commitments and generate a sequestration command to relocate a digital asset to a non-recoverable destination address on a distributed ledger, the command encoding a unique transaction identifier;

an asynchronous listener logic configured to monitor the distributed ledger for a revelation of the secret entropy seed triggered by the unique transaction identifier; and a synthesis module comprising deterministic logic gates configured to calculate, via a transformation function, a new data state based on a deterministic combination of the revealed secret entropy seed and metadata retrieved from the unique transaction identifier, wherein the specific hashed commitment is finalized on the distributed ledger prior to the generation of the sequestration command.

20. The device of claim 19, wherein the processor comprises a trusted execution environment configured to locally verify the revealed entropy seed against the selected hashed commitment.

21. The device of claim 19, wherein the sequestration command includes a metadata template that constrains the synthesis module to a specific subset of the transformation function.

22. The device of claim 19, wherein the metadata retrieved from the unique transaction identifier includes a ledger-provided timestamp and an incrementing account nonce to ensure global uniqueness of the sequestration command.

23. The device of claim 19, wherein the synthesis module is configured to generate a verifiable proof of the new data state while maintaining the privacy of specific metadata attributes of the sequestered digital asset.

24. A method for autonomous state synthesis, comprising:

storing a cryptographic commitment to a secret entropy seed on a persistent data ledger;

sequestering a first digital asset into a non-recoverable ledger state, thereby generating a unique sequestration identifier;

revealing the secret entropy seed only after the generation and verification of the unique sequestration identifier on the persistent data ledger; and minting a second digital asset, wherein attributes of the second digital asset are determined by deterministic synthesis logic enforcing a functional relationship between the revealed secret entropy seed and metadata of the sequestered first digital asset, wherein the cryptographic commitment is finalized on the persistent data ledger prior to the sequestering of the first digital asset.

25. The method of claim 24, comprising verifying a transaction hash of a verifiable burn event on the persistent ledger to confirm the non-recoverable status of the first digital asset prior to revealing the secret entropy seed.

26. The method of claim 24, wherein revealing the secret entropy seed is performed by a decentralized oracle network utilizing an encrypted side-channel from a hardware security module.

27. The method of claim 24, wherein the deterministic synthesis logic incorporates a verifiable delay function to map the entropy seed to a predefined trait set.

28. The method of claim 24, further comprising a verification step where a reconstructed secret entropy seed is matched against the stored cryptographic commitment.

29. The method of claim 24, wherein the functional relationship is configured to aggregate a plurality of sequestered assets as inputs to the deterministic synthesis logic, such that the second digital asset is generated based on aggregated metadata retrieved from the plurality of sequestered assets.

30. The method of claim 24, wherein the storing and sequestering steps are performed on a source network, and the revealing and minting steps are performed on a disparate destination network, and wherein a relayer interface transmits a proof of the unique sequestration identifier to the destination network via a cross-chain messaging protocol.

* * * * *